March 8, 1938.  C. SCHROEDER  2,110,425
STEERING WHEEL MOUNTING
Filed Nov. 21, 1936  3 Sheets-Sheet 1

INVENTOR
Charles Schroeder
BY
A. H. Golden
ATTORNEY

March 8, 1938.  C. SCHROEDER  2,110,425

STEERING WHEEL MOUNTING

Filed Nov. 21, 1936  3 Sheets-Sheet 2

INVENTOR
Charles Schroeder
BY A. H. Golden
ATTORNEY

March 8, 1938.                C. SCHROEDER                2,110,425
                          STEERING WHEEL MOUNTING
                   Filed Nov. 21, 1936        3 Sheets-Sheet 3
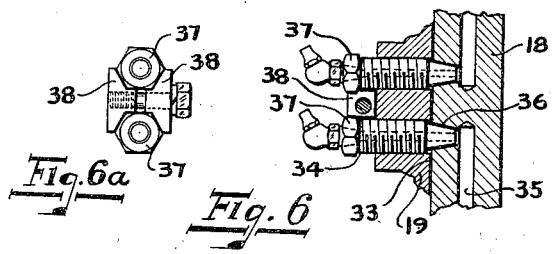
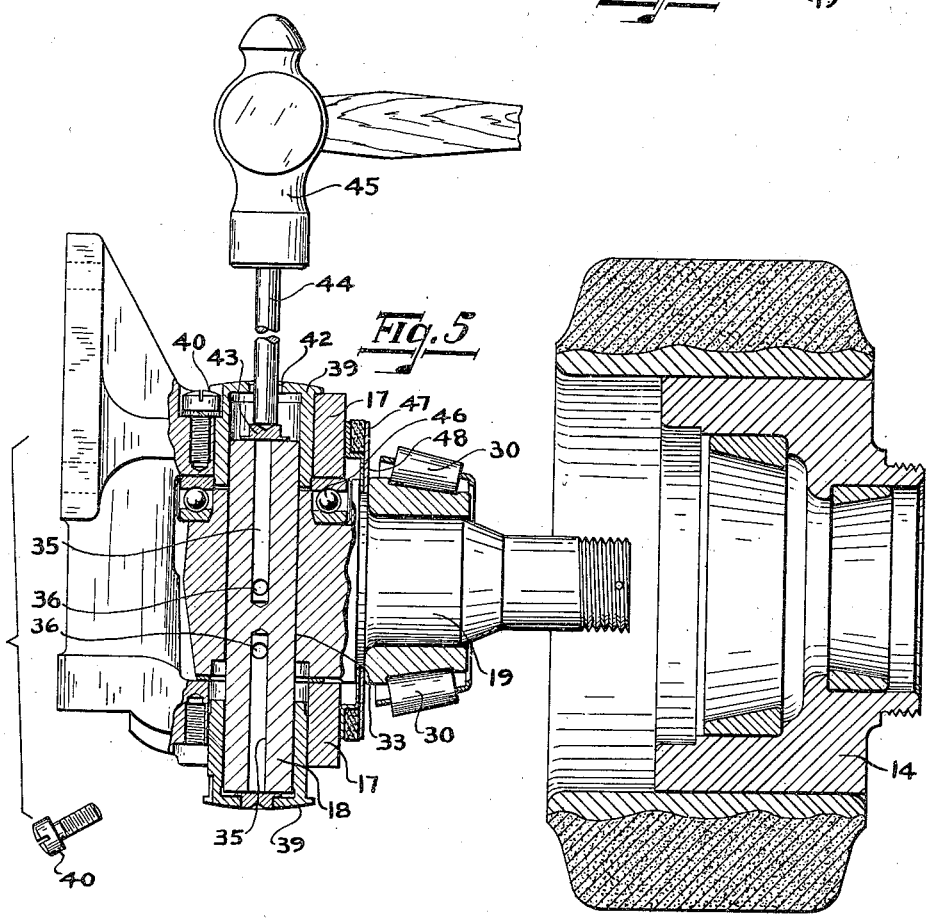
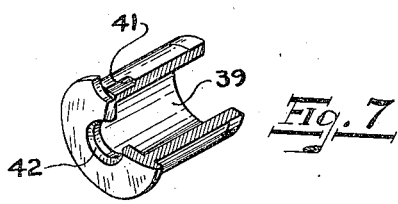
INVENTOR
Charles Schroeder
BY
A. H. Golden
ATTORNEY Patented Mar. 8, 1938

2,110,425

UNITED STATES PATENT OFFICE 2,110,425

STEERING WHEEL MOUNTING

Charles Schroeder, Philadelphia, Pa., assignor to The Yale & Towne Manufacturing Company, Stamford, Conn., a corporation of Connecticut Application November 21, 1936, Serial No. 111,993

10 Claims. (Cl. 280—96.1)

This invention relates to industrial trucks. More particularly, my invention relates to the mounting of the steering wheels on industrial trucks, and especially load supporting steering wheels.

Industrial trucks are usually equipped with a forward low main frame forming the load supporting portion of the truck. The wheels which carry this load supporting portion are generally mounted for steering, and are actuated by a long drag link running to the operator's platform at the rear of the truck and there operated by a steering lever. Because of this very low load supporting portion generally preferred in industrial truck design, the supporting and steering wheels are naturally of very small diameter. Because they have to carry a very high load, they are equipped with relatively broad tires.

This presents a rather difficult steering problem, as will naturally be appreciated. It also makes it rather difficult to obtain a simple and effective mounting for the steering king pin. Also, the king pin mounting must be made so as to be readily disassembled and assembled, and so that the parts thereof which normally wear relatively rapidly may be easily replaced.

My invention has as one of its features, the mounting of the steering king pins in a very unique and distinctive manner, so that they may be readily lubricated, and so that the lubricating material may be properly distributed.

My invention has as a further feature, a unique form of securing means for securing the king pin to the stub axle with which, preferably, the king pin of my invention is adapted to rotate. As a further feature of the invention, I provide a very unique means of assembling the king pin relatively to the stub axle and also relatively to the main frame of the truck, whereby the king pin may be readily assembled and readily disassembled from the load supporting portion of the truck.

As a further feature of the invention, I provide a unique form of bushing for taking the wear of the king pin, the bushing being readily replaceable in the king pin assembly, as will be hereinafter set forth.

Figure 1:
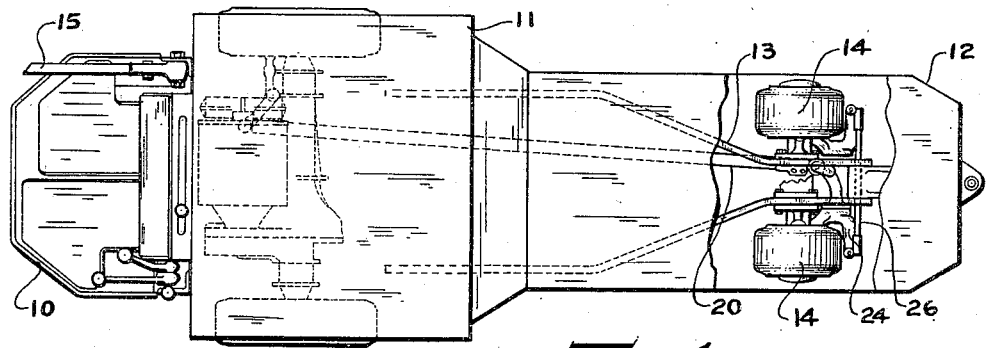
Figure 2:
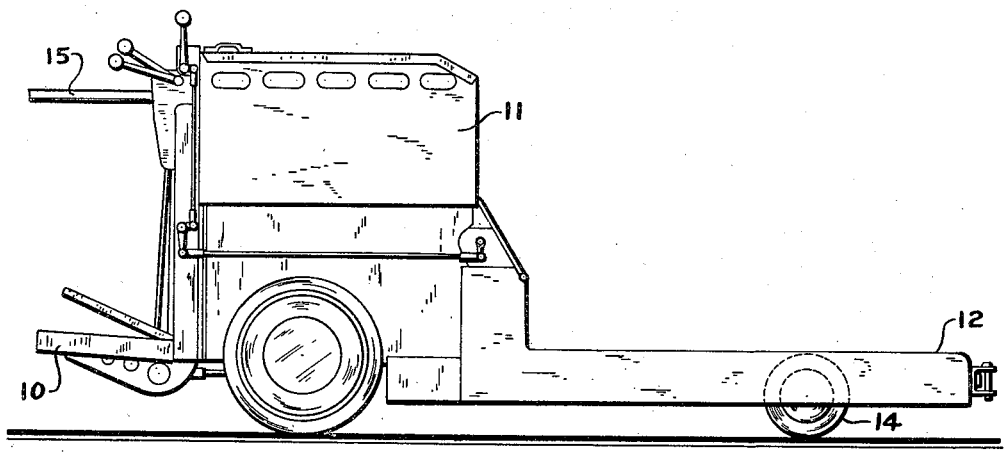
Figure 3:
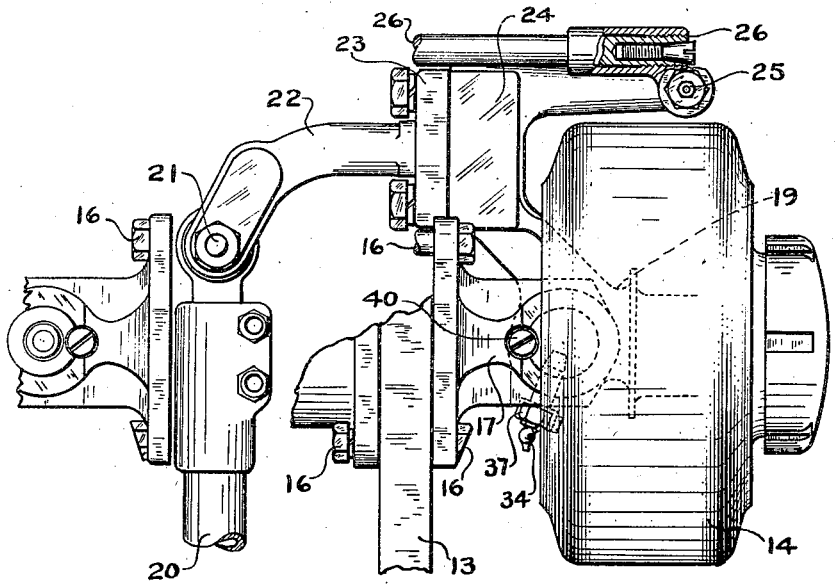
Figure 4:
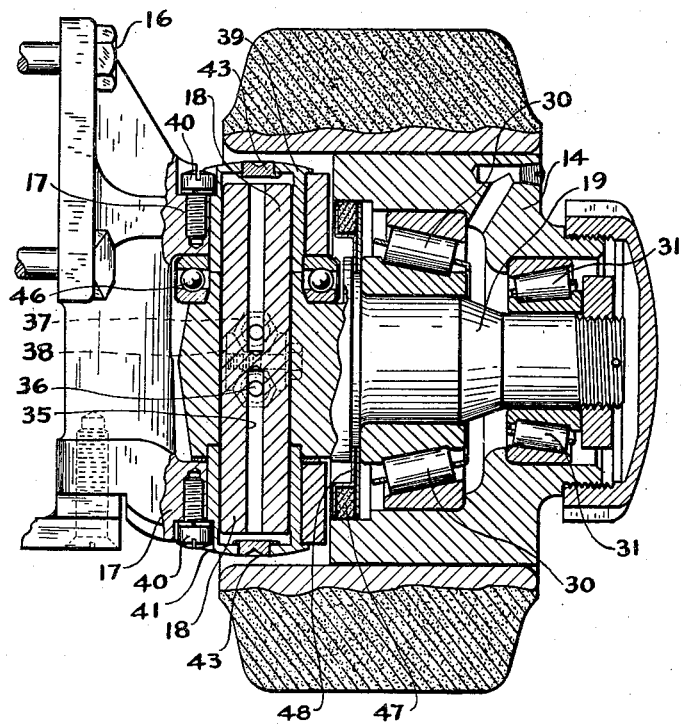

In describing my invention, I shall refer to the drawings wherein Fig. 1 is a plan view of a conventional form of truck showing my invention applied thereto. Fig. 2 is a side view of the truck of Fig. 1. Fig. 3 is an enlarged plan view of part of the load supporting and steering wheel assembly. Fig. 4 is a section through the king pin and steering wheel mounting shown in Fig. 3. Fig. 5 is an exploded view of Fig. 4 showing the wheel removed from the stub axle, and the king pin about to be disassembled relatively to the main frame. Fig. 6 illustrates the lubricating nipples and their assembly relatively to the king pin and stub axle. Fig. 6A illustrates the locking means for maintaining the lubricating nipples against removal. Fig. 7 is a perspective and partial section of one of the bushings for the king pin mounting.

Referring now more particularly to the drawings, Figs. 1 and 2 show a usual type of industrial truck having a platform 10, a battery supporting section 11, a load platform 12, a main frame 13, and load supporting wheels 14, which are adapted to be steered through operation of a steering lever 15. The construction just described is entirely conventional and is, of course, well known in the art.

Referring now to Figs. 3 and 4, the load supporting main frame 13 has secured thereto through bolts 16, or other suitable means, a bracket having formed thereon a pair of bearing ears 17 which are adapted to carry the king pin 18 and the stub axle 19 traversed by the king pin. A drag link 20 is connected at 21 to a further link member 22 which in turn is bolted at 23 to an arm 24 formed as an extension of the stub axle 19, although it may, of course, be a separate arm secured to the stub axle. The function of the members just described is to rotate the stub axle and the king pin on the axis of the king pin and relatively to the bearing ears 17 of the load supporting main frame.

The arm 24 has secured thereto at 25, a link 26, in a conventional manner, and it is through this link 26 that the cooperating or opposite wheel 14 is steered, as is probably best illustrated in Fig. 1.

Referring now to Figs. 4 and 5, each stub axle 19 carries roller bearings 30 and 31 on which is mounted the wheel 14. The mounting of the wheel 14 on the stub axle is conventional and need not be described further. The stub axle 19 is drilled out at 33 for the king pin 18, which is then driven into the said drilled out portion. The king pin 18 has vertical bores 35 and horizontal bores 36 leading to the said vertical bores 35. In Fig. 6, it is shown how the pair of lubricating nipples 34 are screwthreaded into the stub axle 19 so as to enter the horizontal bores 36 of the king pin 18. Lubricating material traversing the nipples 34 will be fed through the bores in the king pin to its upper and lower extremities.

The further function of the lubricating nipples 34 is to maintain the king pin in a fixed vertical position relatively to the stub axle, and also to hold this king pin against sliding movement and against rotation relatively to the stub axle so that, in effect, the king pin 18 and the stub axle 19 will rotate together as a single unit.

Since normal operation may tend to loosen the lubricating nipples 34, and since it is extremely important that the nipples be maintained in place, I use a unique form of locking means for holding the nipples 34 against rotation once they are properly positioned. The hexagonal portions 37 of the nipples 34 cooperate with a pair of lugs 38 which are drawn together against the surfaces of the said hexagonal portions 37, as is best illustrated in Fig. 6A. The lugs 38 securely lock the nipples and maintain them against rotation, thus preventing their movement out of the horizontal bores 36 of the king pin 18.

Since it will be readily appreciated that considerable wear will occur between the king pin 18 and the supporting ears 17, were the king pin to rotate relatively to those ears, I provide rather unique bushings 39, which are cup shaped and which fit about the upper and lower ends of the king pin 18, as is best illustrated in Fig. 4. These bushings are made of bronze and are forced into bored openings in the ears 17. For further maintaining the bushings 39 in position, screws 40 are used, these screws fitting into slotted portions 41 of the bushings 39, as is shown in Figs. 5 and 7, and being threaded into the ears 17. Each of the bushings has an opening 42 which is normally maintained closed by a plug 43.

Fig. 5 illustrates the manner in which the assembly of Fig. 4 may be operated upon to disassemble it. A screw driver first is used to remove the screw 40 in the lower ear 17, so as to release the lower bushing 39. The lubricating nipples 34 are also removed to release the king pin 18. A driving pin 44, actuated by hammer 45, is then used to drive out the plug 43 in the upper bushing, and through it to apply endwise pressure to the king pin 18. This endwise pressure on the king pin 18 drives the king pin out of the drilled bore 33 in the stub axle 19, and also drives the lower bushing 39 out of its bore in the lower ear 17. Naturally, after the king pin has been driven down a sufficient distance, it may be pulled out very easily. Thereafter, the upper screw 40 may be removed and the upper sleeve 39 driven out of the upper ear 17. In this way, it is very easy to replace the bushings 39, as will be appreciated. This facility of disassembly is extremely important in the operation of trucks of this sort, since the bushings will naturally wear relatively rapidly with relation to the other parts of the truck. Of course, the assembly is just as simple as the disassembly, only that it is accomplished in just the opposite manner.

The thrust between the upper ear 17 and the stub axle 19 is taken up by a thrust bearing 46 held in place between the upper ear 17 and the stub axle 19 by the cooperation of both the stub axle 19 and the upper cup shaped bearing sleeve 39.

Before terminating the description of my invention, it would be well to point out that the lubricating material entering through the horizontal bores 36 in the steering king pin 18 moves through the vertical bores 35, and thus into the surfaces between the king pin 18 and the upper and lower cup shaped bearing sleeve 39. Then it moves down through the contact surfaces between bearing sleeves 39 and king pin 18 into the thrust bearing 46. A further packing 47 maintained in position by a disc 48 held in place on the stub axle 19 is used to prevent the leakage of lubricant from bearings 30.

While I have now described a preferred embodiment of my invention, it should be understood that my invention may take various other forms. I therefore do not wish to be limited in my monopoly to the exact form shown.

I claim:

1. In an industrial truck steering wheel assembly, a stub axle, a wheel carried by said axle, a king pin traversing said axle and secured for rotation with said axle on the axis of said king pin, a support for said king pin relatively to which said king pin rotates, a bushing for each end of said king pin carried by said support, and means between each of said bushings and said king pin whereby endwise movement of said king pin will move the said bushings out of the said support.

2. In an industrial truck steering wheel assembly, a stub axle, a wheel carried by said axle, a king pin traversing said axle and secured for rotation with said stub axle on the axis of said king pin, a support for said king pin relatively to which said king pin rotates, a cup shaped bushing for each end of said king pin carried by said support, and covering the end surfaces of said king pin, said bushings being inserted endwise over said king pin and into the support, and openings in said cup shaped bushings whereby access may be had to said king pin.

3. In an industrial truck steering wheel assembly, a stub axle, a wheel carried by said axle, a king pin traversing said axle, means securing said king pin for rotation with said axle on the axis of said king pin, a support for said king pin, a cup shaped bushing for each end of said king pin carried by said support and relatively to which said king pin rotates, a normally closed opening in one of said bushings through which a tool may be inserted to exert pressure against said king pin whereby to drive said king pin axially through said axle when released therefrom, and whereby to drive the other of said cup shaped bushings out of said support.

4. In an industrial truck steering wheel assembly, a support having upper and lower ears, a cup shaped bushing carried by each of said ears, a king pin mounted with its opposite ends in said cup shaped bushings, a stub axle fixed to said king pin for rotation therewith on said bushings, an opening in each of said cups whereby said king pin may be reached by a tool to impart endwise movement thereto when released from said stub axle, either of said cup shaped bushings being movable axially outwardly from its respective ear by endwise pressure exerted thereon by said king pin when said pin is pressed from its opposite end through the opening in the other of said cup shaped bushings.

5. In an industrial truck steering wheel assembly, a support having upper and lower ears, a cup shaped bushing fixed to each of said ears, a king pin mounted with its opposite ends in said cup shaped bushings, a stub axle fixed to said king pin for rotation therewith on said bushings, a thrust bearing between said stub axle and the upper of said ears whereby said axle accepts the load of said support, an opening in each of said cups whereby said king pin may be reached by a tool to impart endwise movement thereto when released from said stub axle, either of said cup shaped bushings being movable axially outwardly from its respective ear by endwise pressure exerted thereon by said king pin when said pin is pressed from its opposite end through the opening in the other of said cup shaped bushings.

6. In an industrial truck steering wheel assembly, a support having upper and lower ears, a cup shaped bushing fixed to each of said ears, a king pin mounted with its opposite ends in said cup shaped bushings, a stub axle fixed to said king pin for rotation therewith on said bushings, a thrust bearing between said stub axle and the upper of said ears whereby said axle accepts the load of said support, an opening in each of said cups whereby said king pin may be reached by a tool to impart endwise movement thereto when released from said stub axle, either of said bushings being movable axially outwardly from its ear by endwise pressure exerted thereon by said king pin when said pin is pressed from its opposite end through the opening in the other of said cup bushings, and means for covering said openings in said cup bushings.

7. In an industrial truck steering wheel assembly, a support having upper and lower ears, a cup shaped bushing fixed to each of said ears, a king pin mounted with its opposite ends in said cup shaped bushings, a stub axle fixed to said king pin for rotation therewith on said bushings, a thrust bearing between said stub axle and the upper of said ears whereby said axle accepts the load of said support, an opening in each of said cups whereby said king pin may be reached by a tool to impart endwise movement thereto when released from said stub axle, either of said bushings being movable axially outwardly from its ear by endwise pressure exerted thereon by said king pin when said pin is pressed from its opposite end through the other of said cup bushings, and means for retaining said cup bushings in position against rotary and endwise movement.

8. In an industrial truck steering wheel assembly, a support having upper and lower ears, a cup shaped bushing fixed to each of said ears, a king pin mounted with its opposite ends in said cup shaped bushings, a stub axle fixed to said king pin for rotation therewith on said bushings, a thrust bearing between said stub axle and the upper of said ears whereby said axle accepts the load of said support independently of said bushings, said thrust bearing being mounted for retention mutually by said stub axle and the upper of said bushings.

9. In an industrial truck steering wheel assembly, a stub axle, a wheel carried by said axle, a king pin traversing said axle and secured for rotation with said stub axle on the axis of said king pin, a support for said king pin relatively to which said king pin rotates, a bushing for each end of said king pin carried by said support and inserted endwise over said king pin into the support, and means between each bushing and the king pin whereby endwise movement of the king pin will move the bushings out of said support.

10. In an industrial truck steering wheel assembly, a stub axle, a wheel carried by said axle, a king pin traversing said axle and secured for rotation with said stub axle on the axis of said king pin, a support for said king pin relatively to which said king pin rotates, a cup shaped bushing for each end of said king pin carried by said support and inserted endwise over said king pin into the support, a flange limiting the insertion of said cup shaped bushings into the support, and an opening in one of said cup shaped bushings through which a tool may be inserted to exert pressure against said king pin whereby to drive said king pin axially through said axle when released therefrom, and whereby to drive the other of said cup shaped bushings out of said support.

CHARLES SCHROEDER.